United States Patent
Elsner et al.

(10) Patent No.: US 6,811,294 B1
(45) Date of Patent: Nov. 2, 2004

(54) DEVICE AND METHOD FOR DEGASSING PLASTICS

(75) Inventors: Thomas Elsner, Düsseldorf (DE); Jürgen Heuser, Krefeld (DE); Christian Kords, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/937,467

(22) PCT Filed: Mar. 14, 2000

(86) PCT No.: PCT/EP00/02240

§ 371 (c)(1),
(2), (4) Date: Sep. 25, 2001

(87) PCT Pub. No.: WO00/58072

PCT Pub. Date: Oct. 5, 2000

(30) Foreign Application Priority Data

Mar. 27, 1999  (DE) ......................... 199 14 143

(51) Int. Cl.⁷ ................................. B29B 7/48
(52) U.S. Cl. ..................... 366/75; 366/85; 366/139; 95/248; 95/260
(58) Field of Search .................... 366/75, 85, 139, 366/301; 425/204, 208, 209, 203, 205; 95/248, 260

(56) References Cited

U.S. PATENT DOCUMENTS

| | | | | |
|---|---|---|---|---|
| 4,260,264 A | * | 4/1981 | Maki et al. | |
| 4,474,473 A | * | 10/1984 | Higuchi et al. | |
| 4,474,475 A | * | 10/1984 | Moriyama | |
| 4,534,652 A | * | 8/1985 | Stade | |
| 4,542,992 A | * | 9/1985 | Markhart | |
| 4,940,329 A | * | 7/1990 | Dienst | |
| 5,292,186 A | * | 3/1994 | Kubo et al. | |
| 5,672,005 A | * | 9/1997 | Fukui et al. | |
| 5,728,337 A | | 3/1998 | Yoshikawa et al. | ......... 264/102 |

FOREIGN PATENT DOCUMENTS

EP    0 665 095 A1    8/1995
JP    2-34307    *    2/1990

* cited by examiner

Primary Examiner—David Sorkin
(74) Attorney, Agent, or Firm—Joseph C. Gil; James R. Franks

(57) ABSTRACT

An apparatus for degassing plastic materials, e.g., high molecular weight polycarbonate solutions, is described. The apparatus includes a double-shaft extruder having a length-to-diameter ratio of less than or equal to 40, which comprises: (i) two co-rotating and meshing shafts; (ii) an intake opening; and (iii) upstream and downstream portions relative to the intake opening. The shafts of the extruder are designed with a double lead in a degassing zone, and with a triple lead in a pressure build-up zone. Each of the degassing and the pressure build-up zones are down-stream from the intake opening, and the pressure build-up zone is further down-stream than the degassing zone. Also described is a process for degassing plastic materials, which involves providing the described double-shaft co-rotating extruder, into which plastic material is fed, processed and degassed. Entraining agents, such as nitrogen, and other processing additives may be introduced into an extruder during the process of the present invention.

13 Claims, 3 Drawing Sheets

DEVICE AND METHOD FOR DEGASSING PLASTICS

CROSS REFERENCE TO RELATED PATENT APPLICATIONS

The present patent application claims the right of priority under 35 U.S.C. 119 (a)–(d) and 35 U.S.C. 365 of International Application No. PCT/EP00/02240, filed 14 Mar. 2000, which was published in German as International Patent Publication No. WO 00/58072 on 5 Oct. 2000, which is entitled to the right of priority of German Patent Application No. 199 14 143.6, filed 27 Mar. 1999.

FIELD OF THE INVENTION

The invention relates to an apparatus and a process for degassing plastic materials, in particular high-molecular polycarbonate solutions, by means of a double-shaft extruder, which comprises shafts rotating in the same direction and meshing with one another.

BACKGROUND OF THE INVENTION

As a result of heightened environmental awareness, increasing demands regarding the removal of volatile components from plastic materials are being placed on the plastics processing industry. This applies particularly with regard to the use of plastic materials in the food sector. The volatile components in the extruded plastic material mostly may not exceed 0.2% by weight and are required to be removed in order to improve the product quality, especially the optical properties. This applies particularly to products made from high-molecular polycarbonate solutions containing chlorobenzene and methylene dichloride as volatile components. In the plastics industry, the removal of volatile components from polymers is known as degassing. Various apparatuses are used for degassing, in particular single- and twin-screw extruders.

In the case of degassing by means of single- and twin-screw extruders, a distinction is made between forward and backward degassing as well as single and multiple degassing. With forward degassing the vent opening of the extruder is disposed—in feed direction of the screw—downstream of the intake of the extruder, whereas with backward degassing it is disposed—in feed direction of the screw—upstream of the intake. Degassing extruders are also used, in which both forward and backward degassing are effected. Depending on the desired residual content of volatile components, single-stage or multi-stage degassing is effected. The number of degassing stages cannot however be increased indefinitely because this entails an increase in the manufacturing cost of the product and frequently also a decrease in product quality. The product quality in said case is particularly dependent upon the processing temperature or the temperature rise as well as the retention time in the extruder of the plastic material to be degassed.

SUMMARY OF THE INVENTION

The object of the invention is to provide an apparatus and a process of the type described initially, which lead to an economical improvement of product quality, and indeed in particular enable manufacture of polycarbonate of a particularly high transmittancy.

Said object is achieved according to the invention in that the shafts (30 and 33) of the extruder are designed with a double lead (19) in the degassing zone and with a triple lead (21) in the pressure build-up zone of the extruder and the extruder has an L:D ratio smaller than/equal to 40, wherein L is the respective screw length and D the respective screw diameter.

Conventional degassing extruders achieve, e.g. in the case of high-molecular types of polycarbonate, transmittancy values of 87 to 88. In comparison, with the apparatus according to the invention and the corresponding process it is surprisingly possible to achieve transmittancy values of 88.5 to 89.5 for said types of polycarbonate.

Furthermore, the cost of manufacturing the product may be reduced because the extruder of the apparatus according to the invention is of a relatively short design and so the spatial requirement and the cost of the apparatus are correspondingly reduced.

Particularly high transmittancy values were achieved with a twin-screw extruder having an L:D ratio in the region of 35 to 40.

To avoid temperature-related quality losses, it is advantageous when the extruder moreover comprises a cooling device defining a cooling zone. In said manner, the product quality may be positively influenced. The shafts of the extruder are preferably designed with a triple lead in the cooling zone.

According to another preferred refinement, kneading elements (20) are disposed immediately downstream of the intake opening of the extruder between the feed elements (19 and 21) of the shafts. The kneading elements are used to introduce energy and in particular to increase the degassing surface.

A high degree of degassing may be achieved particularly when, according to a hither refinement, the extruder in feed direction comprises a plurality of degassing zones, to each of which an exhausting device is connected. Very good results were achieved with an extruder which comprises, in feed direction, downstream of the intake opening three degassing zones, wherein there was generated at the vent opening associated with the first degassing zone an absolute pressure in the region of 0.5 to 1.5 bar, at the vent opening associated with the second degassing zone an absolute pressure in the region of 0.03 to 1.9 bar, and at the vent opening associated with the third degassing zone an absolute pressure in the region of 0.001 to 0.03 bar.

The degassing may moreover be positively influenced by an entraining agent which increases the degassing surface. In the process according to the invention, the entraining agent is admixed preferably in feed direction between a second and third degassing zone. Nitrogen may preferably be used as an entraining agent. The volume rate of flow of the supplied nitrogen should be preferably 2 to 10 Nm³/h, given a shaft rotational speed lower than/equal to 390 rpm.

Further preferred and advantageous refinements of the invention are indicated in the sub-claims.

Figure 1:
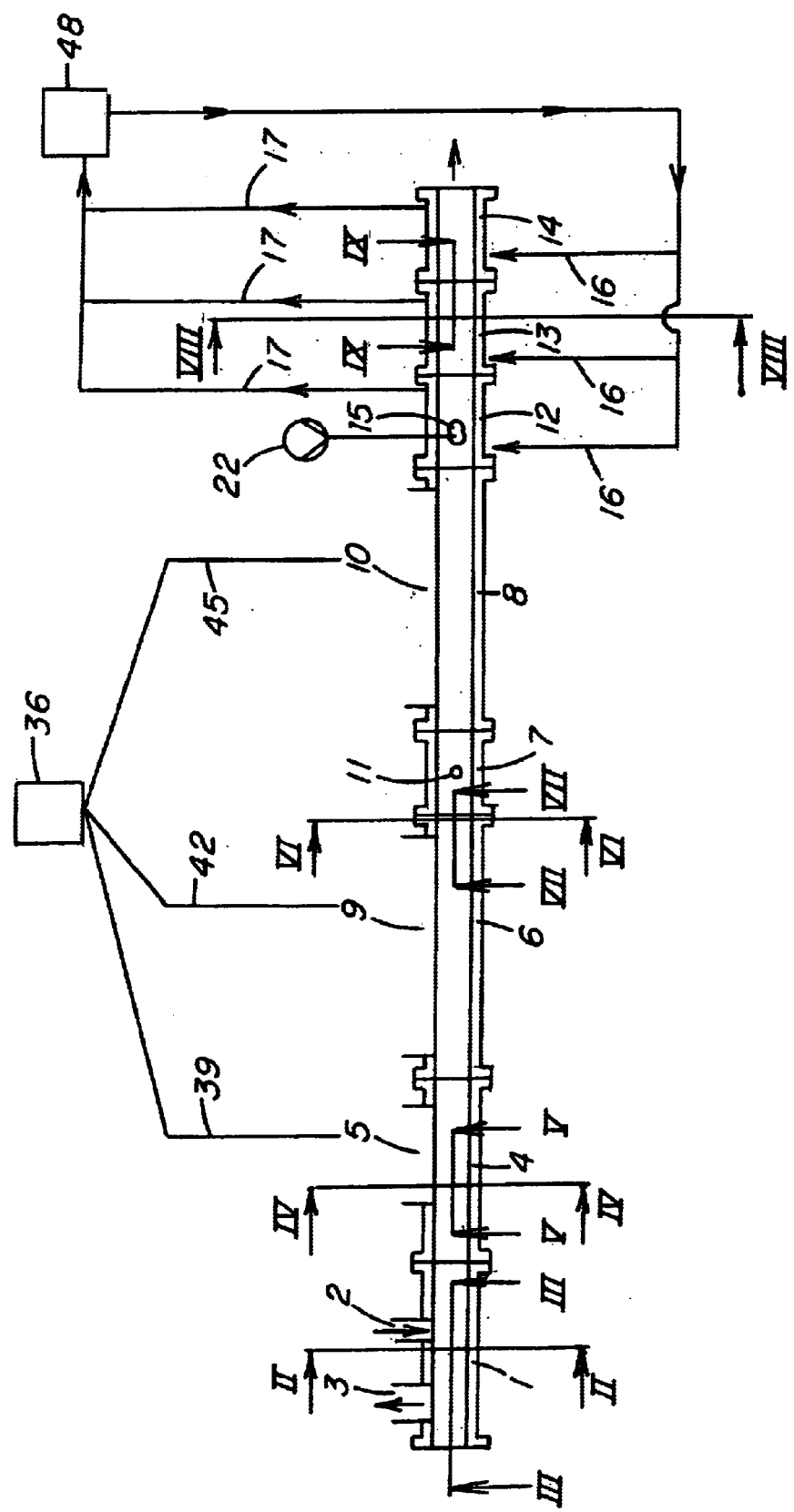
FIG. 1 is a schematic representation of a longitudinal section of a double shaft extruder of an apparatus according to the present invention.
Figure 2:
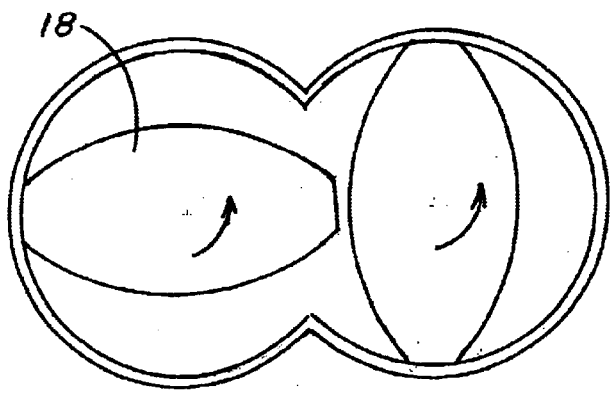
FIG. 2 is a cross sectional representation of double lead feed elements 18 along line II—II in FIG. 1.
Figure 3:
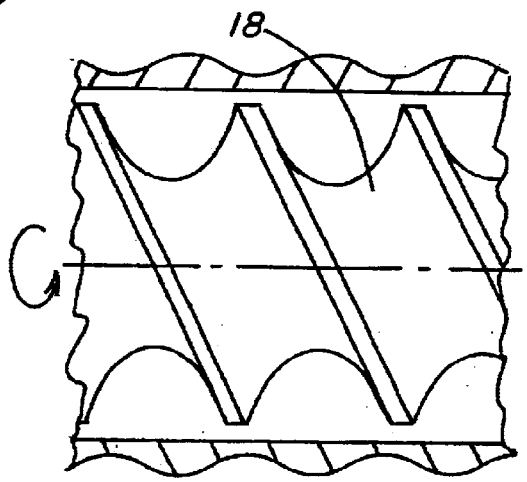
FIG. 3 is a longitudinal representation of double lead feed elements 18 along line III—III in FIG. 1.
Figure 4:
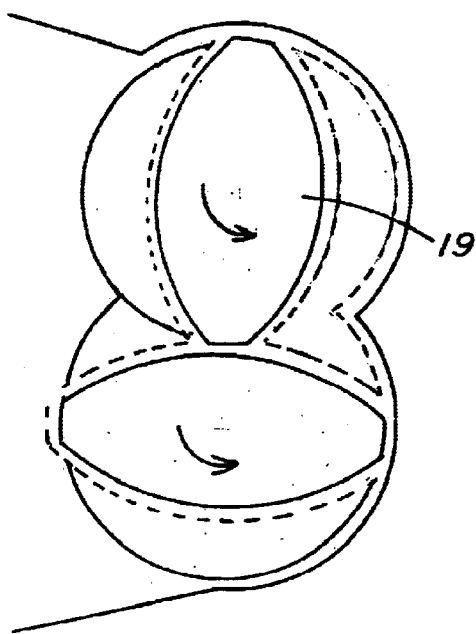
FIG. 4 is a cross sectional representation of double lead feed elements 19 along line IV—IV in FIG. 1.
Figure 5:
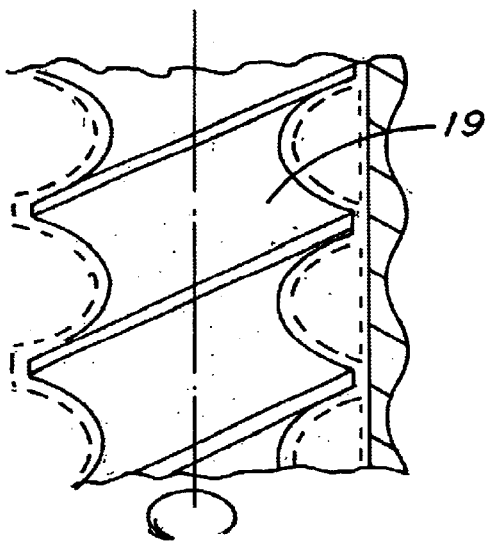
FIG. 5 is a longitudinal representation of double lead feed elements 19 along line V—V in FIG. 1.
Figure 6:
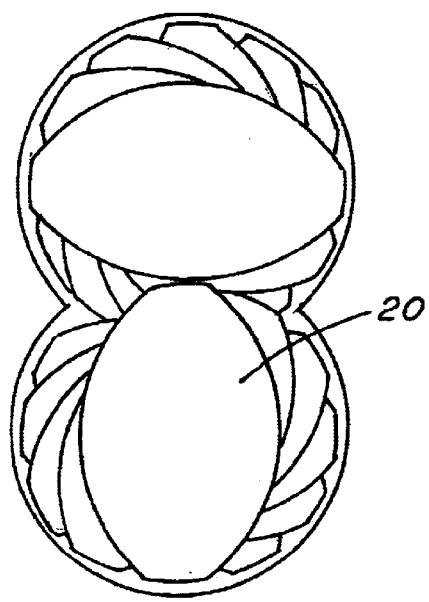
FIG. 6 is a cross sectional representation of double lead kneading elements 20 along line VI—VI in FIG. 1.
Figure 7:
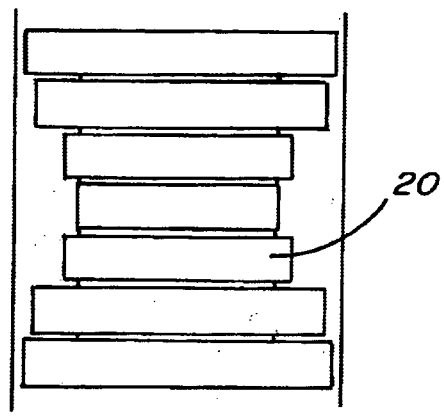
FIG. 7 is a longitudinal representation of double lead kneading elements 20 along line VII—VII in FIG. 1.
Figure 8:
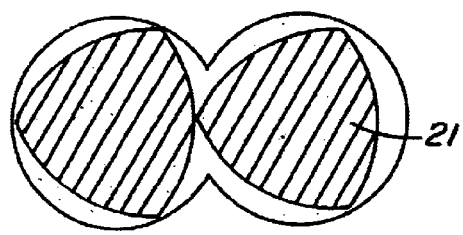
FIG. 8 is a cross sectional representation of triple lead feed elements 21 along line VIII—VIII in FIG. 1.
Figure 9:
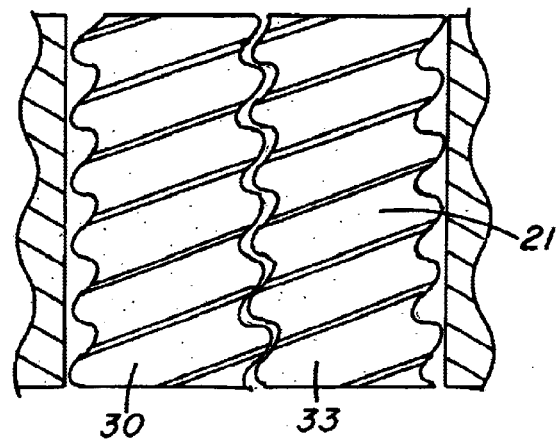
FIG. 9 is a longitudinal representation of triple lead feed elements 21 along line IX—IX in FIG. 1.

There now follows a detailed description of the invention with reference to a drawing illustrating an embodiment. FIG. 1 shows a diagrammatic longitudinal section of a double-shaft extruder of an apparatus according to the invention.

The double-shaft extruder comprises a housing, which is composed of eight parts altogether and in which are disposed two shafts (not shown 30, 33), which rotate in the same direction and mesh with one another. The plastic material to be degassed is supplied to the extruder through the intake opening 2 formed in the first housing part 1. Disposed in feed direction upstream of the intake opening 2 is a vent opening 3 (backward degassing). The drive ends of the shafts are led out-wards through a floating ring seal (not shown) at the, in FIG. 1, left side of the first housing part 1.

Adjoining the first housing part 1 in feed direction is a second housing part 4 of approximately the same length, which has a further vent opening 5. This is followed by a third, longer housing part 6, which is adjoined by a fourth, relatively short housing part 7 followed by a fifth housing part 8, the length of which corresponds to the length of the third housing part 6. The third and fifth housing part 6, 8 have vent openings 9, 10 of equal size, which are more than twice as long as the vent opening 5 of the second housing part 4. The vent openings 5, 9 and 10 are connected to an exhausting device 36 by means of conduits 39, 42 and 45.

The fourth housing part 7 is provided with a connection 11, via which an entraining agent, preferably nitrogen, may be admixed.

The fifth housing part 8 is followed by three housing parts 12, 13, 14 of approximately equal size, which form a pressure build-up zone, at the end of which the degassed product leaves the extruder. It is evident that a connection opening 15 is formed in the sixth housing part 12. Said connection opening may be used to connect a lateral extruder (e.g., an additive admixing charging device 22), by means of which additives may be added to the degassed product.

In the region of said pressure build-up zone, the shafts have a triple-lead profile.

Kneading elements (20) are disposed immediately downstream of the intake opening 2 between the feed elements of the shafts. In the region of the housing parts 1, 4, 6, 7 and 8 the shafts are designed with a double lead (e.g., 18 and 19). The double-lead (e.g., 8 and 19) and triple-lead (e.g., 21) shaft profiles in said case have differing angles of lead and/or directions of lead.

The apparatus according to the invention is operated in such a way that there is at the first vent opening 3 an absolute pressure of 1 to 2 bar, at the second vent opening 5 an absolute pressure of 2.5 to 1.5 bar, at the third vent opening 9 an absolute pressure of 0.03 to 0.9 bar and at the fourth vent opening 10 an absolute pressure of 0.001 to 0.03 bar.

The double-shaft extruder preferably operates at a rotational speed which is lower than/equal to 390 rpm. The volume rate of flow of the supplied nitrogen is preferably 2 to 10 Nm³/h.

To avoid temperature-related quality losses, the extruder is provided with a cooling device 48, which includes inlet conduits 16 and outlet conduits 17 relative to the extruder. The cooling device is formed preferably in the region of the housing parts 12, 13, 14.

It has been shown that with an apparatus configured in said manner it is possible to manufacture a polycarbonate of a particularly high transmittancy, namely transmittancy values of 88.5 to 89.5 in the case of high-molecular (valency number 1.33) types of polycarbonate.

What is claimed is:

1. A process for degassing a plastic material comprising:
   (a) providing a double-shaft extruder comprising,
      (i) two shafts rotating in the same direction and meshing with one another,
      (ii) an intake opening, and
      (iii) upstream and downstream portions relative to said intake opening,
      wherein the extruder has a length-to-diameter ratio of less than or equal to 40, the shafts of the extruder are designed with a double lead in a degassing zone of the extruder, and with a triple lead in a pressure build-up zone of the extruder, each of said degassing zone and said pressure build-up zone being down-stream from said intake opening, and said pressure build-up zone being further down-stream than said degassing zone; and
   (b) feeding said plastic material into said intake opening.

2. The process of claim 1 wherein the length-to-diameter ratio of the extruder is from 35 to 40.

3. The process of claim 1 wherein said extruder further comprises a cooling device defining a cooling zone.

4. The process of claim 3 wherein the shafts are designed with a triple lead in the cooling zone.

5. The process of claim 1 wherein said extruder comprises a plurality of degassing zones located downstream from said intake opening, each of said degassing zones having an exhausting device connected thereto, said degassing zones defining a plurality of forward degassing zones.

6. The process of claim 5 wherein said extruder further comprises a backward degassing vent opening located upstream from said intake opening.

7. The process of claim 5 wherein said extruder comprises first, second and third degassing zones, the absolute pressure generated by the exhausting device of said first degassing zone being from 0.5 to 1.5 bar, the absolute pressure generated by the exhausting device of said second degassing zone being from 0.03 to 1.9 bar, and the degassing pressure generated by the exhausting device of said third degassing zone being from 0.001 to 0.03 bar.

8. The process of claim 5 wherein said extruder comprises first, second and third degassing zones and an entraining agent is introduced into the plastic material within said extruder between said second and third degassing zones.

9. The process of claim 8 wherein said entraining agent is nitrogen.

10. The process of claim 9 wherein the shafts of said extruder are rotated at a speed of less than 390 revolutions per minute, and said entraining agent is introduced into said extruder at a volume rate of 2 to 10 Nm³/h.

11. The process of claim 5 wherein said plurality of degassing zones comprises a last degassing zone located furthest downstream from said intake opening, and said pressure buildup zone is adjoined to said last degassing zone.

12. The process of claim 1 further comprising admixing an entraining agent into the plastic material within said extruder.

13. The process of claim 1 wherein said plastic material is a high-molecular polycarbonate solution.

* * * * *